Oct. 11, 1949.   J. W. FRENCH ET AL   2,484,160
STEREOSCOPIC OBSERVATION INSTRUMENT
Filed Dec. 18, 1946   2 Sheets-Sheet 1
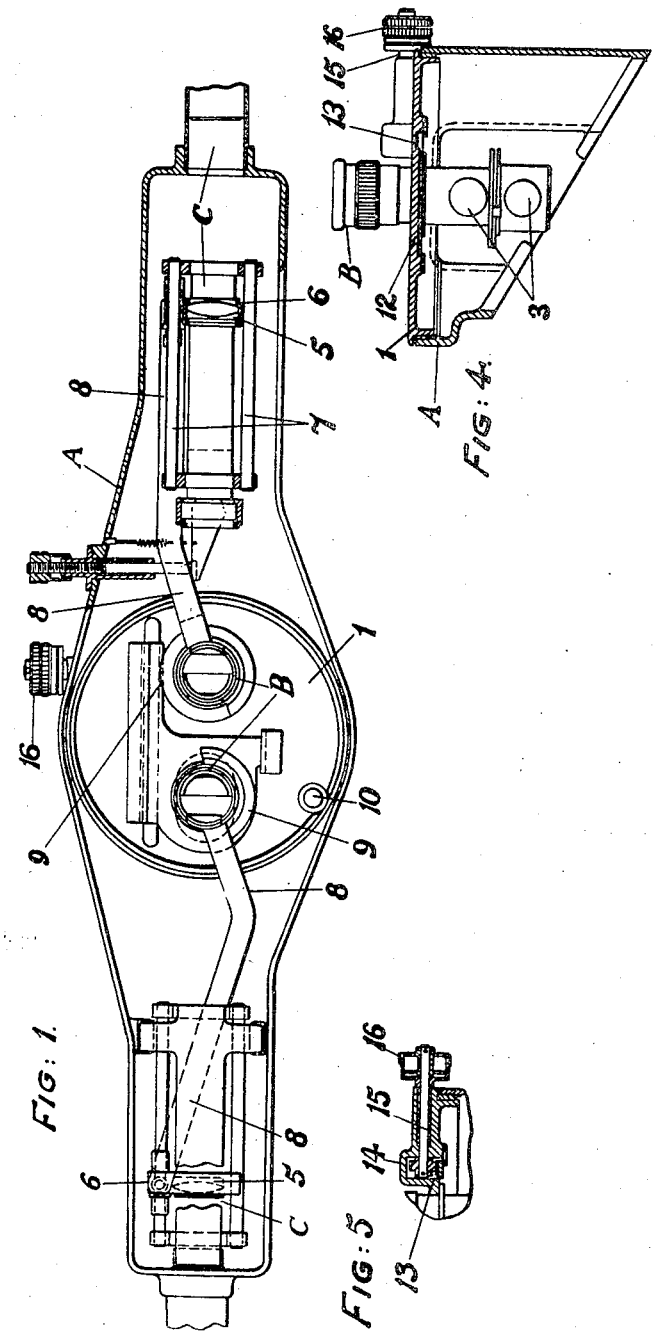
Inventors
James W. French & Claud Foster
By
Young, Emery & Thompson
Attorneys

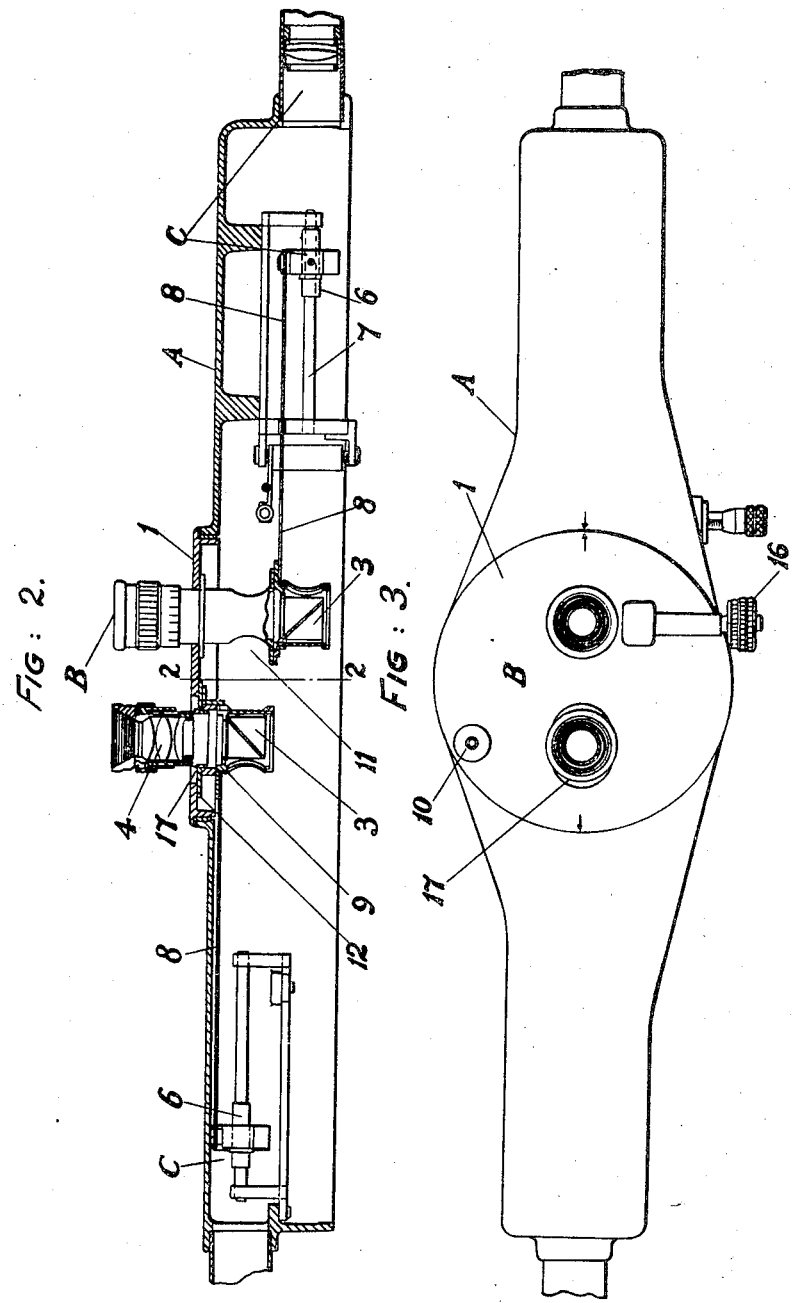

Patented Oct. 11, 1949

2,484,160

UNITED STATES PATENT OFFICE 2,484,160

STEREOSCOPIC OBSERVATION INSTRUMENT

James Weir French and Claud Foster, Glasgow, Scotland, assignors to Barr & Stroud Limited, Glasgow, Scotland Application December 18, 1946, Serial No. 716,954 In Great Britain March 22, 1939

Section 1, Public Law 690, August 8, 1946 Patent expires March 22, 1959

3 Claims. (Cl. 88—29)

This invention refers to stereoscopic observation instruments of the kind comprising a base (assumed to be transverse relative to the observer), with optical means whereby two beams of light from an object (or objects) under observation are brought transversely to two eyepiece systems whose optical axes are at an angle, say at right angles, to the base. The invention refers, for example, to stereoscopic rangefinders, while another example is the stereoscopic comparator of stereogoniometer apparatus used for the examination of aerial photographs.

A stereoscopic optical system may be either ortho-stereoscopic or pseudo-stereoscopic. It is sometimes desirable, however, to provide for changing the optical system from ortho-stereoscopic character to pseudo-stereoscopic character and vice versa at will, and the present invention is concerned with an arrangement for this purpose.

An object of the invention is to provide for such change being made by interchange of the positions of the two eyepiece tubes of the instrument, the arrangement being such that each tube in both its positions is served by the same base optical system with a modification, effected by the action of interchanging the positions of the eyepiece tubes, to compensate for the displacement of the tubes.

The invention will now be described with reference to the accompanying drawing, in which:

Figure 1 is a sectional plan view of the stereoscopic comparator or stereogoniometer plotting apparatus, the view being from the under side, Figure 2 is a longitudinal section through the eyepiece, Figure 3 is a plan view, Figure 4 is a cross section of the instrument, and Figure 5 is a detail.

The instrument comprises a base casing A, two eyepiece tubes B, and two base optical systems C.

The eyepiece tubes B are carried on a circular plate 1 which is rotatable about a central axis 2 relative to the casing A. Within each eyepiece tube B there is a reflecting prism arrangement 3 and an eyepiece combination 4.

Each of the base optical systems C comprises an objective 5 which is mounted on a carrier 6 adapted to slide on parallel guide rods 7 fixed within the casing A. A link 8 is pivoted at one end to the objective carrier 6 and at the other end has a collar 9 which embraces the corresponding eyepiece tube B, the tube being rotatable in the collar 9. As is seen in Figure 2, the right hand objective 5, carrier 6 and guide rods 7 are out of alignment with the corresponding parts at the left hand side, the right hand eyepiece tube B being longer to correspond.

The prisms 3 of the eyepiece tubes receive light from the associated optical systems C and reflect it along the eyepiece tubes B to the eyes of the observer.

In the figures, the optical means are shown in their ortho-stereoscopic condition. On release of a detent 10, the circular plate 1 can be rotated through 180° clockwise as seen in Figure 3 to interchange the positions of the two eyepiece tubes B. As a result of this movement motion along the guides 7 is imparted to each of the carriers 6 and objectives 5 through the medium of the links 8, with the result that the right hand objective 5 is moved along the guides 7 to the left to an extent corresponding with the transverse displacement of the right hand eyepiece tube B and the left hand objective 5 is moved to the right a distance corresponding with the displacement of the left hand eyepiece tube B, so that the distance between each of the prisms 3 and the associated objective remains constant. The system is now pseudo-stereoscopic. An aperture 11 is provided in the longer eyepice tube B to allow of passage of light to the other tube B in the pseudo-stereoscopic condition.

The tubes B are adjustable for interocular distance, the left hand tube in Figures 1, 2 and 3, being mounted on a slide 12 movable transversely relative to the plate 1, by means of a rack 13 on the slide 12, the rack 13 being engaged by a pinion wheel 14 operated by a shaft 15 and head 16 carried on the plate 1. A slot 17 in the plate 1 allows for movement of the slide 12.

We claim:

1. A stereoscopic observation instrument comprising a base extending transversely relative to the observer, two optical systems carried by said base and each having an adjustable optical part, two eyepiece tubes, one for each base optical system, having their optical axes at an angle to the base, a connection between each eyepiece tube and the adjustable optical part of its base optical system, eyepiece reflectors carried by the eyepiece tubes to reflect two transverse beams of light from the base optical systems to the eyepiece systems, and a carrier for the eyepiece tubes which is rotatable through 180° to interchange the positions of the tubes and so convert the instrument from ortho-stereoscopic character to pseudo-stereoscopic character and vice versa, each tube in both its positions being associated with the same base optical system and the interchanging movement of the tubes effecting adjustment of the optical parts in the base optical systems to compensate for the displacement of the tubes in the interchange.

2. A stereoscopic observation instrument comprising a base casing extending transversely relative to the observer, two optical systems in the base casing with their optical axes out of alignment with, but parallel to each other, two eyepieces tubes, one for each base optical system, extending different distances into the base casing and having their optical axes at right angles to the axes of the base optical systems, eyepiece prisms at the inner ends of the tubes and associated with the base optical systems to reflect two transverse beams of light to the eyepiece systems, an axially slidable lens in each base optical system, a connection between each eyepiece tube and the slidable lens in the corresponding optical system, a carrier for the eyepiece tubes which is rotatable through 180° to interchange the positions of the tubes, and a through opening in the longer eyepiece tube in axial alignment with the base optical system of the adjacent eyepiece tube, interchanging of the positions of the tubes converting the instrument from ortho-stereoscopic character to pseudo-stereoscopic character and vice versa, and the interchanging movement effecting sliding adjustment of the lenses in the base optical systems to compensate for the displacement of the tubes in the interchange.

3. A stereoscopic observation instrument according to claim 2, wherein one of the eyepiece tubes is adjustably mounted on the carrier for interocular adjustment.

JAMES WEIR FRENCH.
CLAUD FOSTER.

REFERENCES CITED

The following references are of record in the file of this patent:

UNITED STATES PATENTS

| Number | Name | Date |
| --- | --- | --- |
| 1,679,661 | Hugershoff | Aug. 7, 1928 |
| 2,149,601 | Guldbrandsen | Mar. 7, 1939 |